(12) United States Patent
Csoti et al.

(10) Patent No.: US 11,502,559 B2
(45) Date of Patent: Nov. 15, 2022

(54) STATOR FOR AN ELECTRICAL MACHINE, AN ELECTRICAL MACHINE AND METHOD FOR PRODUCING A STATOR OF THIS KIND

(71) Applicant: Robert Bosch GmbH, Stuttgart (DE)

(72) Inventors: Janos Tamas Csoti, Karlsruhe (DE); Roman Koch, Miskolc (HU); Thomas Devermann, Achern-Fautenbach (DE)

(73) Assignee: Robert Bosch GmbH, Stuttgart (DE)

( * ) Notice: Subject to any disclaimer, the term of this patent is extended or adjusted under 35 U.S.C. 154(b) by 393 days.

(21) Appl. No.: 16/646,839

(22) PCT Filed: Sep. 7, 2018

(86) PCT No.: PCT/EP2018/074084
§ 371 (c)(1),
(2) Date: Mar. 12, 2020

(87) PCT Pub. No.: WO2019/052899
PCT Pub. Date: Mar. 21, 2019

(65) Prior Publication Data
US 2020/0274405 A1      Aug. 27, 2020

(30) Foreign Application Priority Data
Sep. 12, 2017    (DE) ...................... 10 2017 216 084.5

(51) Int. Cl.
*H02K 1/14* (2006.01)
*H02K 3/52* (2006.01)
(Continued)

(52) U.S. Cl.
CPC ............ *H02K 1/146* (2013.01); *H02K 3/522* (2013.01); *H02K 15/0062* (2013.01); *H02K 15/022* (2013.01); *H02K 2201/06* (2013.01)

(58) Field of Classification Search
CPC ........ H02K 5/225; H02K 3/522; H02K 29/08; H02K 15/0062; H02K 3/52; H02K 1/146;
(Continued)

(56) References Cited

U.S. PATENT DOCUMENTS 9,954,408 B2 * 4/2018 Nakamura ............. H02K 3/522
2007/0170792 A1 * 7/2007 Bott ....................... H02K 3/522
                                                              310/71

(Continued)

FOREIGN PATENT DOCUMENTS

CN       1414672 A     4/2003
CN     103532280 A     1/2014
(Continued)

OTHER PUBLICATIONS

International Search Report for Application No. PCT/EP2018/074084 dated Jan. 25, 2019 (English Translation, 2 pages).

*Primary Examiner* — Leda T Pham
(74) *Attorney, Agent, or Firm* — Michael Best & Friedrich LLP

(57) ABSTRACT

Stator and method for producing a stator for an electrical machine, comprising a stator main body (34) which has radial stator teeth (14) for receiving coils (17) of an electrical winding and, on an end side of the stator main body (34), has an insulating lamination (40) with receiving pockets (46) for insulation-displacement terminal elements (70), wherein the coils (17) are wound by means of a winding wire which is inserted into the receiving pockets (46), wherein an interconnection plate (52) has annular conductors (84) on which in each case a plurality of insulation-displacement terminal elements (70) are arranged, which insulation-displacement terminal elements axially engage into the receiving pockets (46) in order to make electrical contact with the winding wire, wherein the interconnection plate (52) is manufactured
(Continued)

from plastic and has annular grooves (59) which are open axially at the bottom and into which the annular conductors (84) are inserted.

25 Claims, 5 Drawing Sheets

(51) Int. Cl.
*H02K 15/00* (2006.01)
*H02K 15/02* (2006.01)

(58) Field of Classification Search
CPC ...... H02K 15/02; H02K 1/185; H02K 15/022; H02K 15/095; H02K 3/38; H02K 1/187
See application file for complete search history.

(56) References Cited

U.S. PATENT DOCUMENTS

2011/0057524 A1 3/2011 Andrieux et al.
2012/0293024 A1* 11/2012 Yokogawa ............... H02K 3/32
310/43

FOREIGN PATENT DOCUMENTS

| | | |
|---|---|---|
| CN | 105305687 A | 2/2016 |
| CN | 105765829 A | 7/2016 |
| DE | 102008055731 | 5/2010 |
| DE | 102008054523 | 6/2010 |
| DE | 102012106471 | 2/2014 |
| DE | 102012023477 | 5/2014 |
| DE | 102015208425 | 11/2015 |
| DE | 102014220201 | 4/2016 |
| DE | 102015200093 | 7/2016 |
| DE | 102015217017 | 3/2017 |
| DE | 102015222642 | 5/2017 |
| DE | 102015226416 | 6/2017 |
| DE | 102016201312 | 8/2017 |
| DE | 102016206657 | 10/2017 |
| DE | 102016223003 | 11/2017 |
| DE | 102016224526 | 6/2018 |
| EP | 2306622 | 4/2011 |
| FR | 2923951 | 5/2009 |
| JP | 2002300745 A | 10/2002 |
| WO | 2016124636 | 8/2016 |
| WO | 2017133737 | 8/2017 |

* cited by examiner

STATOR FOR AN ELECTRICAL MACHINE, AN ELECTRICAL MACHINE AND METHOD FOR PRODUCING A STATOR OF THIS KIND

BACKGROUND OF THE INVENTION

The invention relates to a stator for an electrical machine, and to an electrical machine and to a method for producing a stator of this kind.

DE 10 2008 064 523 A1 has disclosed a stator of an electrical machine, the stator being assembled from wound individual tooth segments. The tooth segments have an insulating mask in which in each case two receiving pockets for the two wire ends of a coil are inserted. The interconnect plate has a main ring and a plurality of insulating separating rings, between which a plurality of contact rings are stacked axially. Insulation-displacement clamps are molded onto the contact rings and are pressed axially into the receiving pockets in the insulating masks. With such axial stacking of the contact rings, it is very difficult to reliably press the multiplicity of insulation-displacement clamps into the receiving pockets without the insulation-displacement clamps bending with respect to the contact rings. There is the risk here that the insulation-displacement clamps may not make reliable contact with the wire ends in the receiving pockets because the insulation-displacement clamps may tilt in the receiving pocket. This disadvantageous is intended to be eliminated by the solution according to the invention.

SUMMARY OF THE INVENTION

By contrast, the device according to the invention and the method according to the invention have the advantage that reliable electrical contact with the coils can be made by fitting the insulation-displacement elements axially into the receiving pockets, without further substance-to-substance bonding processes being necessary. For the interconnection of the individual coils, an interconnect plate is fitted axially onto the insulating lamination. The interconnect plate contains annular metal conductor strips with insulation-displacement elements molded thereon. The insulation-displacement elements extend in the axial direction beyond the conductor strips and are each pressed axially into the receiving pockets in which the winding wire is arranged in the radial direction. During the axial fitting-in of the insulation-displacement elements, the fork contact of the insulation-displacement clamp engages around the winding wire in the receiving pocket and cuts into the winding wire in order to produce an electrical contact. The annular conductor strips are arranged radially next to one another in the interconnect plate and are insulated from one another. For example, the conductor strips are fitted into annular grooves which are open axially downward. The cross section of the conductor strips and of the grooves has a higher extent in the axial direction than in the radial direction. This design of the conductors with the insulation-displacement elements is less susceptible to bending, as a result of which insulation-displacement connections which are more reliable can be produced.

It is particularly advantageous to design the conductors as bent and punched parts with insulation-displacement elements molded integrally thereon. At the same time, phase connection pins via which the coils are activated are molded integrally onto the bent and punched parts. The phase connection pins are arranged on the annular conductors in the opposite direction to the insulation-displacement elements and form an electrical interface with an electronic unit for activating the electrical machine.

The annular conductors have different radii so that they can be arranged in an insulated manner radially next to one another. Axial construction space is thereby saved. The insulation-displacement elements of the individual conductors are molded on differently in relation to the annular conductors such that all of the insulation-displacement elements are arranged on the same radius as all of the receiving pockets. For this purpose, the insulation-displacement connections of the radially inner conductors are, for example, bent over outward in a radially offset manner such that they lie on the radius of the outer conductor, the insulation-displacement elements of which then extend rectilinearly axially. As a result, all of the insulation-displacement elements can be pressed axially in the same manner into the receiving pockets by defined forces by means of identical installation fingers, and therefore reliable insulation-displacement connections can be produced in a defined manner. Precisely three conductors are preferably arranged on three different radii here.

It is particularly advantageous if all of the conductors which are arranged in the interconnect plate form precisely one electrical phase with precisely one connection pin. In the case of a continuously wound stator, all of the coils are already connected to one another, and therefore the conductors can make contact directly with the connecting wires between the coils and can therefore interconnect the individual coils in series or parallel to one another. With an unchanged winding, both a triangular circuit and a star point circuit can be produced by appropriate adaptation of the conductors.

In order that the interconnect plate—and therefore also the insulation-displacement elements—are positioned exactly with respect to the receiving pockets, centering pins which extend in the axial direction are molded onto the insulating lamination. Accordingly, centering openings in which the centering pins engage axially are formed in the axial direction on the interconnect plate. After the centering and the axial fitting of the interconnect plate, the centering pins reach completely through, for example, the centering receptacles designed as through openings. Therefore, after the interconnect plate is fitted, the free ends of the centering pins can be deformed plastically in order to form a form-fitting connection. The interconnect plate is thereby reliably secured axially on the stator main body. The plastic material deformation can be carried out particularly simply by hot stamping of the centering pin produced from plastic.

The interconnect plate has an outside and inside diameter approximately corresponding to the outside and inside diameter of the stator main body. The construction space can therefore be optimally used for the arrangement of the conductors, and at the same time mechanical stabilization of the interconnect plate can be achieved for the defined axial pressing thereof into the insulating lamination. Particularly advantageously, a radial recess can be formed on the inside diameter in an angular portion of the carrier ring made of plastic, into which recess a sensor element can be fitted. The latter is fastened to the electrical machine, for example axially above the interconnect plate, and engages axially in the recess. The sensor element is preferably designed as a magnetic field sensor which interacts with a magnetic field transducer of the rotor in order to determine the rotational position of the latter.

In a preferred embodiment, one stator tooth after the other is wound in the circumferential direction in a directly consecutive sequence in the circumferential direction. The coils are particularly advantageously manufactured by means of needle winding, wherein precisely one coil is wound in each case on one stator tooth. By means of the winding sequence of respectively directly adjacent stator teeth, the connecting portions of the winding wire between the coils each extend only over the circumferential angle of the stator grooves. This prevents the connecting portions between different coils from being arranged axially one above another, as a result of which the risk of short circuits is reduced and axial construction space is saved.

In order that the conductors can be fitted axially into the carrier ring, an axially upper side of the latter has an annular surface on which the conductors are supported axially from below. In order to exert forces, which are defined for the installation of the interconnect plate, on the insulation-displacement elements, installation openings are formed in the carrier ring, through which axial installation pins reach in order to lie directly against the insulation-displacement elements. As a result, the insulation-displacement elements can be pressed neatly axially into the receiving pockets with a defined force without a disturbing influence of transverse forces. For this purpose, shoulders on which the installation pins press axially are molded on both sides onto the insulation-displacement elements. Two installation pins per insulation-displacement element, all on the same radius, press the interconnect plate simultaneously into the insulating lamination, as a result of which a very uniform distribution of forces is achieved. Precisely one receiving pocket and precisely one insulation-displacement element are arranged for each coil, wherein an additional receiving pocket and an additional insulation-displacement element are arranged for the beginning of the wire and the end of the wire. In one example of twelve coils, precisely thirteen insulation-displacement elements are therefore molded on, said elements then being pressed axially with twenty-six installation pins into precisely thirteen receiving pockets.

Furthermore, axial test bores are likewise formed in the carrier ring as through openings. Through the latter, test electrodes can make contact with the electrical conductors and can thus check after the installation whether all of the insulation-displacement connections have been correctly formed. Precisely one test bore through which in each case one test electrode makes direct contact with the conductors is arranged here for each conductor—and therefore in particular for each phase.

Furthermore advantageously, axial guide channels for the phase connection pins are integrally formed on the carrier ring. The axially protruding phase connection pins are mechanically stabilized by said guide channels. For this purpose, stiffening ribs are preferably formed on the guide channels, in particular integrally with the interconnect plate as a plastics injection molded part. Precisely three guide channels are formed in the case of three phases and three conductors, said guide channels preferably being arranged closely next to one another within a limited angular region of the carrier ring. As a result, the phase connection pins can simply be made contact with axially above the interconnect plate by electronics.

Such a winding method is particularly also suitable for what is referred to as a skewed stator, in which the stator teeth are not arranged axially parallel to the stator axis, but rather run obliquely with respect to the stator axis in the circumferential direction. Such a skewed stator is realized, for example, by means of sheet-metal laminations which are each stacked on one another in a manner slightly rotated in relation to one another in the circumferential direction. The individual sheet-metal laminations together form the stator stack which has a return ring which is closed in the circumferential direction and which is adjoined radially by the stator teeth.

The receiving pockets have a greater extent in the circumferential direction than in the radial direction. The winding wire from a first coil is guided radially here through the receiving pocket to the radial outer side of the stator and is subsequently guided radially inward again in an adjacent clearance in the circumferential direction to the next stator tooth. As a result, two adjacent coils are connected to each other in a direct shortest route by means of the connecting portion of the winding wire on the radial outer side of the insulating lamination. The winding wire is held tightly within the receiving pockets, and therefore the fork contact of the insulation-displacement element cuts reliably into the winding wire during the axial pressing-in. The insulation-displacement element clamps here, in particular by means of latching lugs molded thereon, in the receiving pocket.

A stator of this kind is particularly suitable for an electrical machine in which the stator is pushed axially into a motor housing. On both sides of the stator here, bearing covers are arranged on the motor housing, in which bearing covers the rotor is accommodated. The electrical machine is designed, for example, as an internal rotor, and therefore the rotor is rotatable in the inner cavity of the stator. The interconnect plate is preferably connected to activation electronics which regulate the electronic commutation of the stator and are preferably arranged axially above the interconnect plate. Such an EC motor can be used particularly advantageously for adjusting movable parts or as a rotary drive for components in a motor vehicle.

With the method according to the invention for producing the stator, the insulation-displacement connections between the interconnect plate and the winding wire can be formed clearly more reliably. As the insulating lamination, here preferably a separately manufactured component—in particular a plastics injection molded part—is pressed axially onto the end side of the stator main body. After winding of the individual coils onto the individual stator teeth, the winding wire is inserted directly into the receiving pockets.

After the winding of the stator main body is finished, the interconnect plate is pressed on axially in such a manner that the insulation-displacement elements of the interconnect plate engage axially in the receiving pockets in order to make electrical contact directly with the winding wires. The installation fingers all reach simultaneously through the axial installation openings in the carrier ring. The installation fingers preferably lie directly against shoulders on both sides of the insulation-displacement elements in order to press the latter axially downward.

The carrier ring is preferably pressed axially against the insulating lamination until measurement pins detect a predetermined axial position on defined supporting surfaces on the carrier ring. The interconnect plate is then fastened in this position to the stator main body. For this purpose, the free ends of the fixing pins protruding from the centering openings are particularly advantageously deformed plastically in order to form a form-fitting connection with the interconnect plate. If the installation fingers pressing axially onto the insulation-displacement elements are then removed, the insulation-displacement connections remain behind below the secured interconnect plate without further action of axial prestressing forces. The insulation-displacement connection thereby remains mechanically stable even in the event of changing environmental conditions, such as temperature fluctuations and shaking. A stator of this kind is therefore also highly robust against high shaking loads and extreme weather conditions and is therefore suitable for use in motor vehicles—in particular outside the passenger compartment.

BRIEF DESCRIPTION OF THE DRAWINGS

Exemplary embodiments of the invention are illustrated in the drawings and explained in more detail in the description below.

In the drawings.

DETAILED DESCRIPTION

Figure 1:
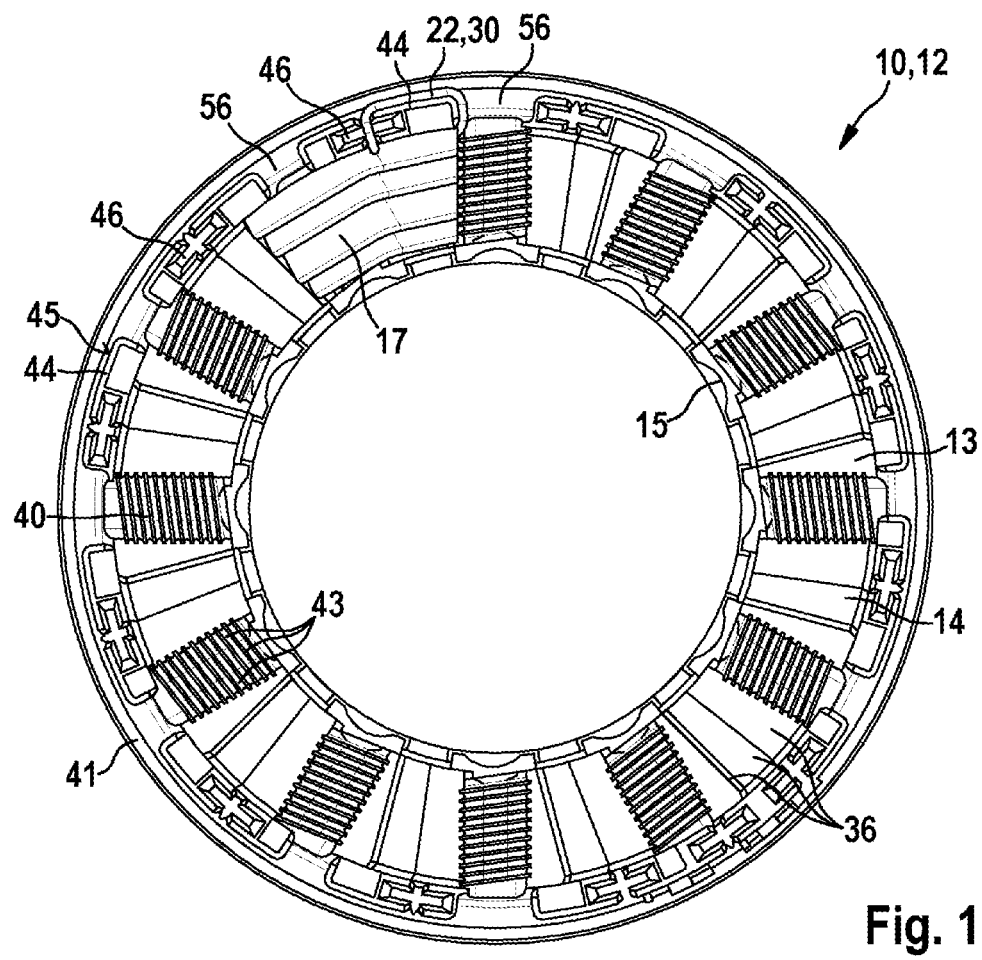
FIG. 1 shows a top view of a stator after a first stator tooth has been wound.

FIG. 1 illustrates a stator 10 of an electrical machine 12, which stator has a return ring 38 which is closed in the circumferential direction 2 and onto which radial stator teeth 14 are molded. In this embodiment, the stator teeth 14 point radially inward, and therefore a rotor, not illustrated, which is driven as an internal rotor by the stator 10 can be mounted within the stator teeth 14. The stator 10 is assembled from individual sheet-metal laminations 36 which are stacked one above another in the axial direction 3 and are connected to form a common lamination stack 35. The sheet-metal laminations 36 are preferably punched out, and therefore the stator teeth 14 are formed integrally with the return ring 38. The lamination stack 35 forms the stator main body 34 which, in an alternative embodiment, can also be formed integrally without sheet-metal laminations 36. In FIG. 1, for example, the individual sheet-metal laminations 36 are rotated slightly in relation to one another in the circumferential direction 2, and therefore the stator teeth 14 do not run parallel to the axial direction 3, but rather are formed in a skewed manner in the circumferential direction 2. An insulating lamination 40 is arranged on a first axial end side 39 of the stator main body 34 and preferably completely covers the end side 39 with an insulating material. The insulating lamination 40 is preferably designed as a plastics injection molded part which is pressed axially onto the stator main body 34. The radial ends of the stator teeth 14 have a tooth head 15 which is wider in the circumferential direction 2 than the actual stator tooth 14, which is wound, in the radial region. The insulating lamination 40 has a projecting length 33 in the axial direction 3 and in the circumferential direction 2 in the region of the tooth head 15, said projecting length holding the coil 17 on the stator tooth 14. Grooves 43 into which the winding wire 22 is inserted are formed in the insulating lamination 40 over the extent of the stator tooth 14 in the radial direction 4. Radially on the outside, the insulating lamination 40 has a closed circumference 41, onto which guide elements 44 are molded which guide the connecting portions 30 of the winding wire 22 between the individual coils 17. The guide elements 44 extend in the axial direction 3, wherein the winding wire 22 is guided outward in the radial direction 4 in order to be guided in the circumferential direction 2 on the radial outer side 45 of the guide elements 44. Furthermore, receiving pockets 46 into which the winding wire 22 is inserted, in order to be connected to insulation-displacement elements 70, are formed on the closed circumference 41 of the insulating lamination 40. The receiving pockets 46 have a greater dimension in the circumferential direction 2 than in the radial direction 4. All of the receiving pockets 46 are preferably arranged on the same radius with respect to the stator axis. As is apparent from FIG. 1, the receiving pockets 46 are preferably arranged in the region of stator grooves 13 between the stator teeth 14. Each stator tooth 14 is assigned precisely one receiving pocket 46, wherein an additional receiving pocket 46 is arranged for the beginning of the winding wire. FIG. 1 merely schematically illustrates the winding of a single coil 17, rather than the beginning of the coil wire. The coil 17 is wound around the stator tooth 14 by means of a nozzle 54 of a needle winding device. After the winding of a coil 17 is completed, the winding wire 22 is guided radially outward through the receiving pocket 46 and guided in the circumferential direction 2 on the radial outer side 45 of the guide elements 44 to the next stator tooth 14. For this purpose, the winding wire 22 is guided again radially inward through a clearance 56 between the guide elements 44 to the next stator tooth 14.

Figure 2:
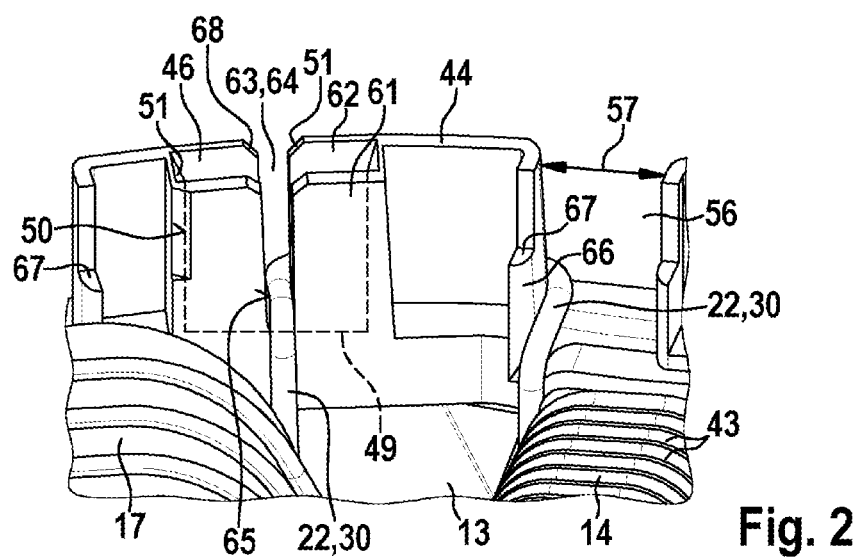
FIG. 2 shows a detailed view of the routing of the wire in a receiving pocket.

FIG. 2 illustrates an enlarged view of the routing of the wire of two adjacent coils 17. The receiving pocket 46 has a first radially inner pocket wall 61 and a second radially outer pocket wall 62. The first and the second pocket walls 61, 62 are arranged approximately parallel to each other. The two pocket walls 61, 62 have an axial slot 63 which is designed in each case as a radial through opening 64. The second radial pocket wall 62 at the same time also forms a radial outer side 45 of the guide elements 44. The guide element 44 here forms an extension of the second radial pocket wall 62 in the circumferential direction 2. The guide element 44 is adjoined in the circumferential direction 2 by the clearance 56, wherein the clearance 56 has a side wall 66 running radially with respect to the radial outer side 45 of the guide element 44. The winding wire 22 is guided radially inward along the side wall 66 and wound around the next stator tooth 14. In a preferred embodiment, the directly adjacent stator teeth 14 are in each case wound directly one after another, and therefore the connecting wire 30 between two individual coils 17 extends in each case only over the stator groove 13 in the circumferential direction 2. In this embodiment, the axial extent of the guide element 44 is identical to the axial extent of the receiving pocket 46 in order to mechanically stabilize the latter. The axial slot 63 of the first and/or second pocket wall 61, 62 has a tapering 65 downward such that the winding wire 22 on being fitted into the slot 63 is clamped in a defined position. A base surface 49 of the receiving pocket 46 is arranged axially lower than the lower end of the slot 63 so that the corresponding insulation-displacement element 70 can extend in the axial direction 3 beyond the winding wire 30 toward the pocket base surface 49. The slots 63 have an introducing phase 68 at their axially open end so that the winding wire 22 can be introduced more easily. Fitting aids 51, for example in the form of slopes, which center the insulation-displacement elements 70 in the receiving pocket 46 are also formed on inner sides 50 of the receiving pocket 46.

Figure 3:
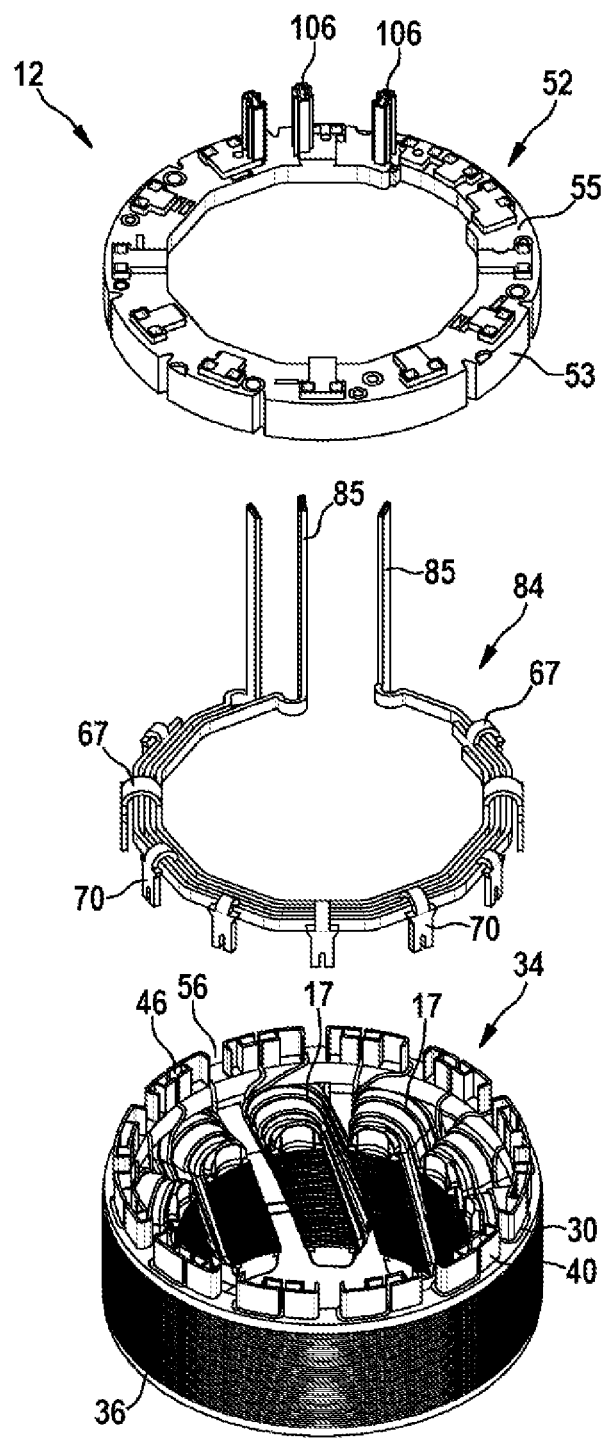
FIGS. 3 and 4 show exploded drawings of the installation of the interconnect plate.

FIG. 3 shows an exploded illustration before an interconnect plate 52 is placed axially onto the wound stator main body 34. The interconnect plate 52 has a carrier ring 53 made of plastic, into which annular electrical conductors 84 are fitted axially. For this purpose, a plurality of annular axial grooves 59 into which the conductors 84 are clipped or clamped are formed in the carrier ring 53. The conductors 84 are thereby guided in the radial direction 4 by insulating walls 58 between the grooves 59 and are electrically insulated. The grooves 59 and the conductors 84 can also have a polygonal—in particular dodecagonal—shape which is approximate to a ring. For example, precisely three conductors 84 for three phases 26 are arranged in the carrier ring 53. The conductors 84 are designed, for example, as bent and punched parts which extend over a substantial part of the circumference of the carrier ring 53. A phase connection pin 85 which extends away from the stator main body 34 preferably in the axial direction 3 is molded onto each of the conductors 84. The phase connection pins 85 are held in axial guide channels 106 which are molded integrally onto the carrier ring 53. The phase connection pins 85 completely penetrate the axial guide channels 106 in the axial direction 3 and make contact at their free ends with activation electronics of the electrical machine 12. Insulation-displacement elements 70 of the conductors 84 that are preferably punched out in one piece with the conductors 84 extend in the axially opposite direction toward the stator main body 34. Although in this exemplary embodiment the different conductors 84 are arranged on different radii, the insulation-displacement elements 70 of the conductors 84 are each bent over at connecting regions in such a manner that they are all arranged on a single identical radius which here lies radially outside the annular grooves 59. After the conductors 84 have been fitted with their phase connection pins 85 into the carrier ring 53, the entire interconnect plate 52 is pressed axially with the insulation-displacement elements 70 into the receiving pockets 46. In the example of a stator main body 34 which is wound continuously without interruption, overall one more receiving pocket 46 is formed than the number of stator teeth 14. In this embodiment, in the event of twelve stator teeth 14, thirteen receiving pockets 46 and accordingly thirteen insulation-displacement elements 70 are formed. All of the receiving pockets 46 and accordingly all of the insulation-displacement elements 70 are preferably arranged on a single identical radius. After the insulation-displacement elements 70 have been pressed on, the interconnect plate 52 is secured fixedly on the stator main body 34. All of the coils 17 are then connected via the conductors 84 to, for example, three phases 26 which can be activated via the phase connection pins 85 in order to realize electrical commutation for the rotor.

Figure 4:
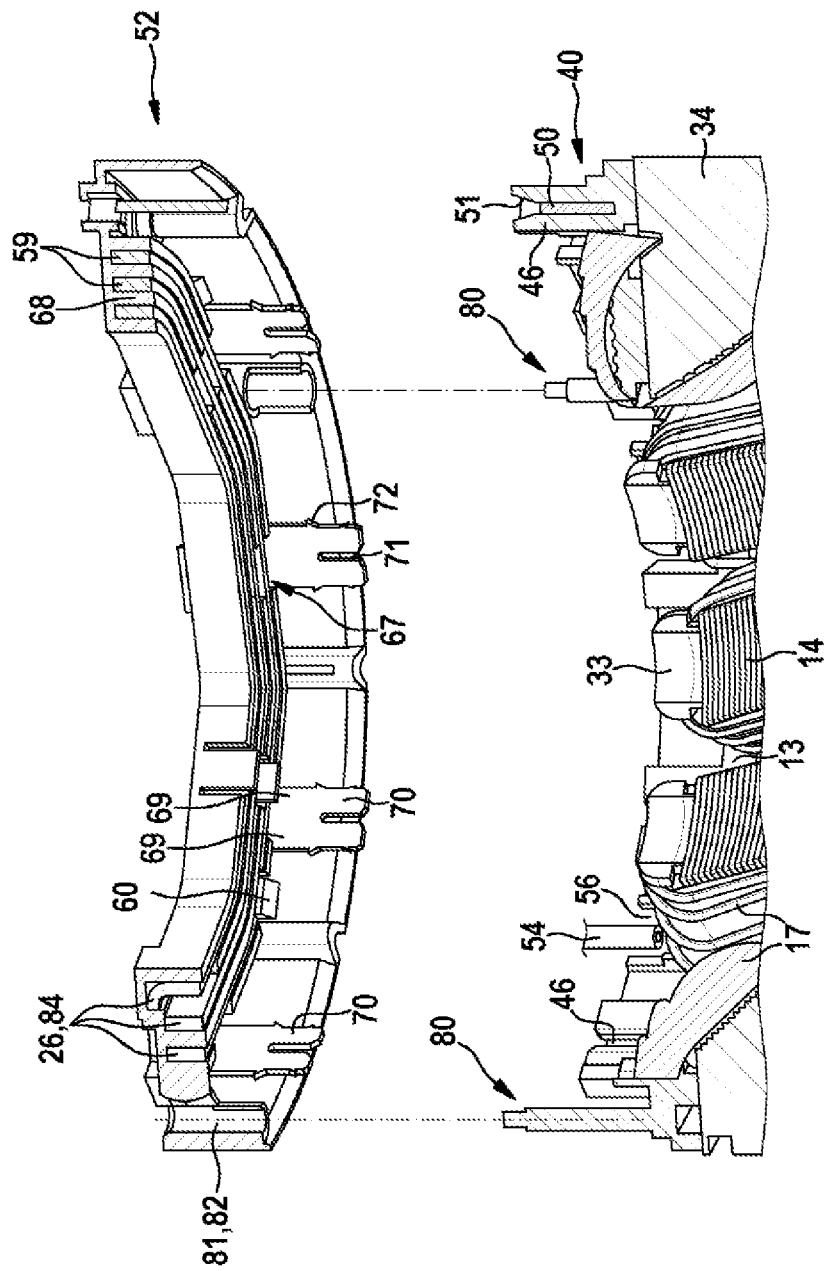

FIG. 4 illustrates a completely wound stator 10 onto which the interconnect plate 52 is now fitted axially. For this purpose, axially extending centering pins 80 are molded onto the insulating lamination 40 and engage in corresponding centering receptacles 81 in the interconnect plate 52. The centering receptacles 81 are designed as axial through holes 82. During the axial fitting of the interconnect plate 52, the insulation-displacement elements 70 are positioned exactly with respect to the receiving pockets 46 by the centering pins 80 and the centering receptacles 81. The insulation-displacement elements 70 are arranged here on the annular conductors 84 which are fitted in an electrically insulated manner into the interconnect plate 52. For example, the individual conductors 84 are assigned to the different phases 26, and therefore, for example, a plurality of coils 17 are connected to one another by a conductor 84 to form a phase 26. The conductors 84 are designed here as punched and bent parts, onto which the insulation-displacement elements 70 are integrally molded. The conductors 84 are arranged on different radii in the interconnect plate 52, wherein the insulation-displacement elements 70 are preferably bent over radially in such a manner that all of the insulation-displacement elements 70 are arranged on the same radius of the receiving pockets 46. The insulation-displacement elements 70 have a greater width in the circumferential direction 2 than in the radial direction 4. Centrally with respect to the circumferential direction 2, a fork 76 is formed on the insulation-displacement elements 70, the fork being pushed via the winding wire 22 within the receiving pocket 46 during the axial fitting and thereby forming an insulation-displacement connection which is electrically conductive. The insulation-displacement elements 70 are pressed into the receiving pockets 46 in such a manner that they are automatically centered with respect to the winding wire 22 and are clamped, for example, by means of latching lugs 72 molded thereon on the inner side 50 of the receiving pockets 46. In FIG. 4, for example, three separate conductors 84 for the three phases 26 are fitted in the interconnect plate 52. The individual phases 26 can be interconnected optionally in a triangular circuit or a star point circuit, wherein, for example, the three phase connection pins 85 are arranged on the interconnect plate 52 in order to energize the coils 17. The winding nozzle 54 which is so narrow in the circumferential direction 2 that it can be guided radially through the clearance 56 in order to deposit the winding wire 22 in the clearance 56 is illustrated schematically. All of the coils 17 can thus preferably be continuously wound with an uninterrupted winding wire 22.

Figure 5:
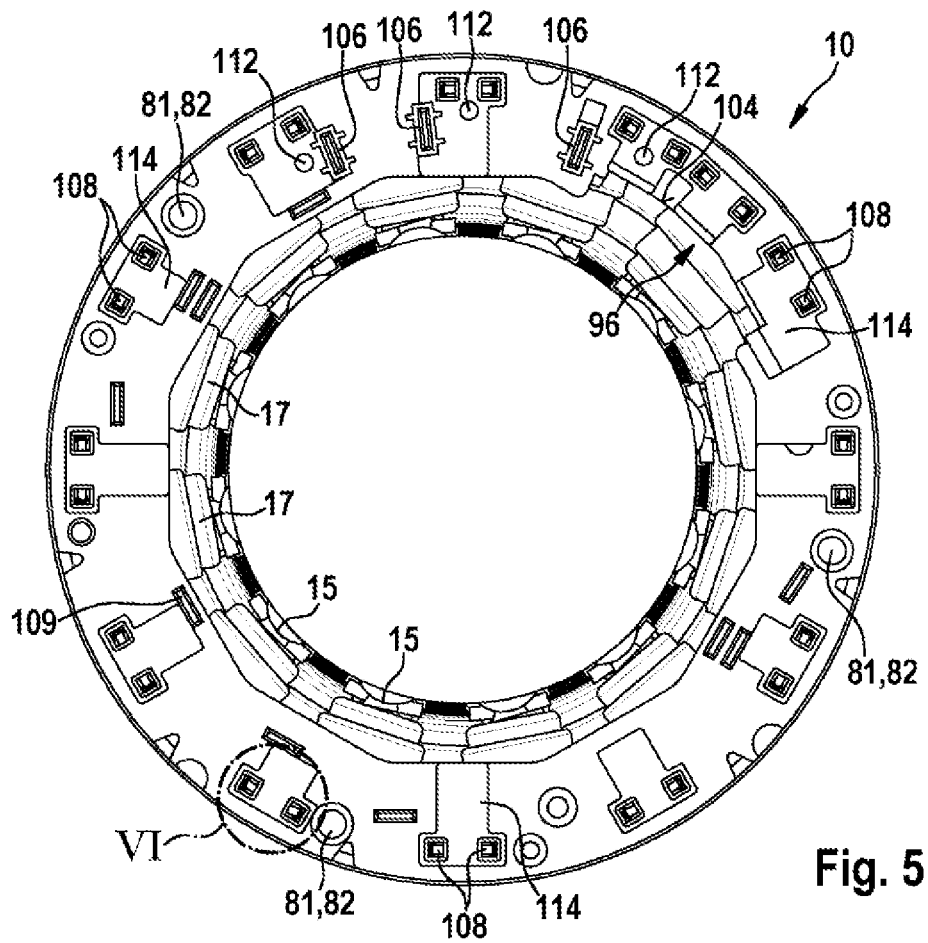
FIG. 5 shows a top view of the completely installed interconnect plate.

FIG. 5 illustrates a top view of the installed interconnect plate 52. The outside diameter of the carrier ring 53 approximately corresponds to the outside diameter of the stator main body 34. The inside diameter of the carrier ring 53 is somewhat larger than the inside diameter of the stator main body 34. A radial formation 104 is recessed on the carrier ring 53 over an angular region 96, in which radial formation a rotational position sensor, not illustrated, can be accommodated. For this purpose, the inside diameter of the carrier ring 53 is larger in said angular region 96 than over the rest of the circumference. The sensor is preferably fastened to an end shield or to an electronic unit of the electrical machine 12 and engages axially in the recess 104. The rotational position sensor is, for example, a magnetic field sensor and is electrically connected not to the interconnect plate 52, but rather, for example, directly to the electronic unit which is arranged axially over the interconnect plate 52. All of the axial guide channels 106 for the connection pins 85 are preferably arranged in a limited angular region of in particular less than 60°. The centering receptacles 81 are designed as axial through holes 82 through which the centering pins 80 completely project. The centering receptacles 81, in particular at least three thereof, are distributed over the circumference. Furthermore, installation openings 108 are formed in the carrier ring 53 as through openings through which installation fingers 110 rest directly on the insulation-displacement elements 70 in order to press the latter axially into the receiving pockets 46. In the exemplary embodiment, each insulation-displacement element 70 has two shoulders 69 onto which a respective installation finger presses directly axially. Between the two shoulders 69, the insulation-displacement elements 70 are attached to the annular conductors 84 by means of a connecting region 67. Two adjacent, separate installation openings 108 are formed here on the two shoulders 69 of a single insulation-displacement element 70, wherein the connecting region 67 lies axially against the carrier ring 53. The connecting regions 67 can optionally have through bores, by means of which the conductors 84 are hot-calked to the carrier ring 53. Therefore, twice as many installation openings 110 distributed over the circumference are formed than insulation-displacement elements—i.e., for example, a total of twenty-six installation openings 110 for twelve stator teeth 14. Furthermore, axial test openings 112 are formed on the carrier ring 53, through which test electrodes can be applied to the conductors 84. For example, precisely one test opening 112 is formed for each conductor 84. After the interconnect plate 52 is installed, it is possible to test by means of the test electrodes whether the insulation-displacement connections are formed reliably between the conductors 84 and the winding wire 22. In order to measure how far the interconnect plate 52 is to be pressed axially against the stator main body 34 in order to bring the insulation-displacement connections into a defined force-free position, defined supporting surfaces 114 are molded onto the upper side 55 of the carrier ring 53, against which supporting surfaces, for example, a mechanical scanner lies in order to measure the axial position of the carrier ring 53. Holding regions or holding openings 120 are optionally molded onto the carrier ring 53, at which a gripper grips the interconnect plate 52 during the installation in order to push the latter onto the centering pins 80 in the correct position. In FIG. 5, manufacturing openings 109 are furthermore formed in the carrier ring 53, through which slides of the injection molding tool reach in order to mold clip elements 60 onto the grooves 59 for the conductors 84. When the conductors 84 are fitted axially into the grooves 59, the conductors 84 are held axially by being clipped in by the clip elements 60.

Figure 6:
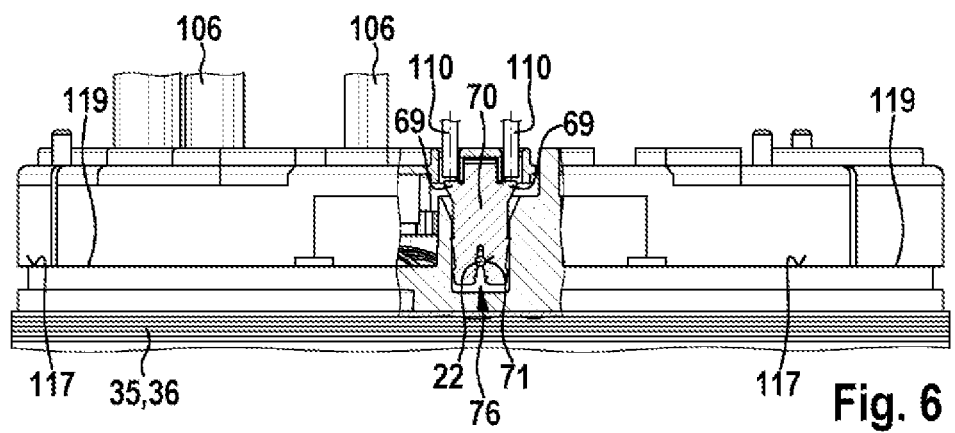
FIG. 6 shows a side view of the completely installed interconnect plate.

FIG. 6 illustrates the side view of the completely installed interconnect plate 52 which lies axially against the insulating lamination 40. For this purpose, defined supporting surfaces are molded onto the carrier ring 53 on the side facing the stator main body 34 and lie directly against corresponding contact surfaces 117 of the insulating lamination 40. The insulating lamination 40 lies in turn against the axial end side 39 of the lamination stack 35. The interconnect plate 52 is pressed on axially via the installation fingers 110 which press the interconnect plate 52 axially against the stator main body 34 via the insulation-displacement element 70. The carrier ring 53 is optionally elastically deformed here within certain limits in order to hold the insulation-displacement connections without force once the installation fingers 110 are removed. During the installation of the interconnect plate 52, in each case two installation fingers 110 lie symmetrically directly against the opposite shoulders 69 on each insulation-displacement element 70. During the axial pressing on, first of all the insulation-displacement contact with the winding wire 22 is formed and at the same time the carrier ring 53 is exactly positioned axially. The interconnect plate 52 is then secured fixedly—for example by means of the fixing pins 80.

Figure 7:
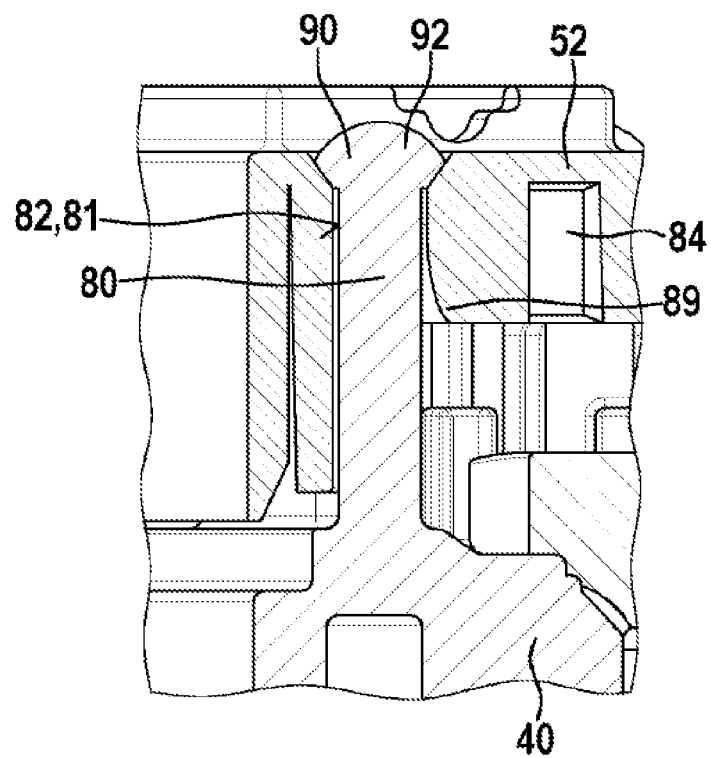
FIG. 7 shows a sectional illustration through the fastening device of the interconnect plate on the stator main body.

In the detailed drawing according to FIG. 7, the interconnect plate 52 is fitted axially completely onto the wound stator 10. In the section through the centering receptacle 81, an introducing phase 89 can be seen, via which component and process tolerances are compensated for. After the centering pins 80 are completely fitted axially into the corresponding centering receptacles 81, an axial end region 90 of the centering pins 80 is plastically deformed in order to form a form-fitting connection with respect to the axial direction 3. The centering pins 80 are formed integrally here with the insulating lamination 40 as a plastics injection molded part. As a result, the end regions 90 can be deformed by means of hot-calking, and therefore a pin head 92 is formed in the end region 90, the pin head having a larger diameter than the centering receptacles 81.

As a result, the interconnect plate 52 is reliably connected axially to the insulating lamination 40.

In an alternative embodiment, the stator 10 can also be formed without the stator teeth 14 being skewed, and therefore the stator teeth 14 extend parallel to the longitudinal axis of the stator. In a further variant, the stator 10 can be used for an external rotor motor, in which the stator teeth 14 extend radially outward from the return ring 38, and the rotor is arranged radially outside the stator 10. In a variation, the stator main body 34 can also be assembled from previously wound individual tooth segments, in which the receiving pockets 46 are formed in the respective insulating masks of the individual tooth segments.

It should be noted that diverse possibilities of combining the individual features with one another are possible in respect of the exemplary embodiments shown in the figures and in the description. For example, the specific design, the arrangement and number of coils 17, and the design and number of receiving pockets 46, 48 can be correspondingly varied. The receiving pockets 46 can be molded directly into an insulating mask injected onto the stator main body 34 or into a separately manufactured insulating lamination 40 which is placed onto the stator main body 14. The position and design of the insulation-displacement elements 70 and the interface of the phase connection pins 85 with the electronic unit can also be adapted to the requirements of the electrical machine 12 and the manufacturing possibilities. In the interconnect plate 52, different connections can be realized by means of the insulation-displacement elements according to the invention which are molded onto the conductors 84. The shape and position of the centering receptacles 80, the guide channels 106, the installation openings 110 and/or the test bores 112 can be correspondingly adapted here. The invention is suitable particularly for the rotational drive of components or the adjustment of components in motor vehicles, but is not restricted to said use.

What is claimed is:

1. A stator (10) for an electrical machine (12), the stator comprising a stator main body (34) which has radial stator teeth (14) for receiving coils (17) of an electrical winding (18) and, on an end side (39) of the stator main body (34), has an insulating lamination (40) with receiving pockets (46) for insulation-displacement elements (70), wherein the coils (17) are wound by means of a winding wire (22) which is inserted into the receiving pockets (46), wherein an interconnect plate (52) has annular conductors (84), each of the annular conductors (84) having thereon a plurality of insulation-displacement elements (70) arranged to engage axially in the receiving pockets (46) in order to make electrical contact with the winding wire (22), wherein the interconnect plate (52) is manufactured from plastic and has annular grooves (59) which are open axially downward and into which the annular conductors (84) are fitted, and wherein axial centering pins (80) which engage in corresponding centering receptacles (81) in the interconnect plate (52) are molded onto the insulating lamination (40).

2. The stator (10) as claimed in claim 1, characterized in that the annular conductors (84) are manufactured as punched and bent parts on which the insulation-displacement elements (70) are molded integrally, and respective phase connection pins (85) via which individual phases (26) of the electrical winding (18) are energized are molded on the annular conductors (84).

3. The stator (10) as claimed in claim 2, characterized in that axial guide channels (106) through which the phase connection pins (85) project axially are molded onto an upper side (55) of the interconnect plate (52).

4. The stator (10) as claimed in claim 2, characterized in that axial guide channels (106) through which the phase connection pins (85) project axially are molded onto an upper side (55) of the interconnect plate (52), wherein precisely three axial guide channels (106) extend in an axial direction (3) directly adjacent in a radial region of the closed carrier ring (53).

5. The stator (10) as claimed in claim 1, characterized in that precisely three annular conductors (84) are arranged on different radii in the interconnect plate (52).

6. The stator (10) as claimed in claim 1, characterized in that each annular conductor (84) is assigned precisely one phase (26) having precisely one phase connection pin (85).

7. The stator (10) as claimed in claim 1, characterized in that the interconnect plate (52) forms a closed carrier ring (53), an outside diameter of which approximately corresponds to an outside diameter of the stator main body (34) and an inside diameter of which is larger than an inside diameter of the stator main body (34).

8. The stator (10) as claimed in claim 1, characterized in that all of the coils (17) are continuously wound directly one after another with an uninterrupted winding wire (22) on stator teeth (14) which are directly adjacent in a circumferential direction (2).

9. The stator (10) as claimed in claim 1, characterized in that an axially upper side (55) of the interconnect plate (52) has axially continuous installation openings (108) through which installation fingers (110) reach axially in order to lie directly against the insulation-displacement elements (70) in order to press said elements axially into the receiving pockets (46).

10. The stator (10) as claimed in claim 1, characterized in that axial test bores (112) are formed on an upper side (55) of the interconnect plate (52) through which test electrodes can make direct contact with the conductors (84) in order to test the quality of the insulation-displacement connections.

11. The stator (10) as claimed in claim 1, characterized in that the stator main body (34) is stacked from individual sheet-metal laminations (36) which have a closed yoke ring (38) and radial stator teeth (14) molded thereon.

12. The stator (10) as claimed in claim 1, characterized in that the receiving pockets (46) have two radial walls (61, 62) which extend in a circumferential direction (2) and in which a radial aperture (64) is formed as an axially upwardly open slot (63) into which the winding wire (22) is inserted, wherein the insulation-displacement elements (70) are wider in the circumferential direction (2) than in a radial direction (4) and, centrally with respect to the circumferential direction (2), form a fork (76) with cutting edges (71) which are pushed axially over the winding wire (22) in order to cut into the winding wire and thereby to form an electrical contact, wherein outer sides (77) of the insulation-displacement elements (70) are securely clamped in the receiving pockets (46).

13. A method for producing a stator (10) as claimed in claim 1, the method comprising the following method steps:
axially fitting an insulating lamination (40) onto an end side (39) of the stator teeth (14);
then winding coils (17) onto the stator teeth (14), wherein, after each winding of a coil (17), the winding wire (22) is guided radially through a receiving pocket (46) for an insulation-displacement element (70); and
axially fitting an interconnect plate (52) over the insulating lamination (40) onto the stator main body (34) in such a manner that installation fingers (110) through axial installation openings (108) in the interconnect plate (52) rest axially directly on the insulation-displacement elements (70) and press the latter into the receiving pockets (46) in order to make electrical contact with the winding wire (22).

14. The method as claimed in claim 13, wherein axially fitting the interconnect plate includes:
pressing the insulation-displacement elements (70) axially downward until the interconnect plate (52) is pressed to a stop against the insulating mask (40) and is thus secured; and
removing the installation fingers (110) from the insulation-displacement elements (70), such that no axial forces act on the insulation-displacement connections;
wherein two installation fingers are used in particular simultaneously to press directly against precisely one insulation-displacement element, preferably against all of the insulation-displacement elements simultaneously.

15. The stator (10) as claimed in claim 1, characterized in that precisely three annular conductors (84) are arranged on different radii in the interconnect plate (52), wherein the insulation-displacement elements (70) are molded thereon in such a manner that all of the insulation-displacement elements (70) of all of the conductors (84) are arranged on an identical radius which corresponds to the radius on which all of the receiving pockets (46) are arranged.

16. The stator (10) as claimed in claim 1, characterized in that each annular conductor (84) is assigned precisely one phase (26) having precisely one phase connection pin (85), and the phases (26) are interconnected to form a star point circuit or a triangular circuit.

17. The stator (10) as claimed in claim 1, wherein the centering receptacles (81) are designed as through holes (82) and the axial end (92) of the centering pins (80) is deformed by means of hot calking in order to form a form-fitting connection with the interconnect plate (52).

18. The stator (10) as claimed in claim 1, characterized in that the interconnect plate (52) forms a closed carrier ring (53), an outside diameter of which approximately corresponds to an outside diameter of the stator main body (34) and an inside diameter of which is larger than an inside diameter of the stator main body (34), wherein the closed carrier ring (53) has an enlarged inside diameter (104) over a certain angular region in order to receive a rotational position sensor for the rotor in said region.

19. The stator (10) as claimed in claim 1, characterized in that all of the coils (17) are continuously wound by needle winding directly one after another with an uninterrupted winding wire (22) on stator teeth (14) which are directly adjacent in a circumferential direction (2).

20. The stator (10) as claimed in claim 1, characterized in that an axially upper side (55) of the interconnect plate (52) has axially continuous installation openings (108) through which installation fingers (110) reach axially in order to lie directly against shoulders (69) of the insulation-displacement elements (70) in order to press said elements axially into the receiving pockets (46).

21. The stator (10) as claimed in claim 1, characterized in that axial test bores (112) are formed on an upper side (55) of the interconnect plate (52), with precisely one test bore (112) for each annular conductor (84) of three phases (26), through which test electrodes can make direct contact with the annular conductors (84) in order to test the quality of the insulation-displacement connections.

22. The stator (10) as claimed in claim 1, characterized in that the stator main body (34) is stacked from individual sheet-metal laminations (36) which have a closed yoke ring

(38) and radial stator teeth (14) molded thereon, wherein the individual sheet-metal laminations (36) are arranged rotated with respect to one another in a circumferential direction (2), and therefore the stator teeth (14) are formed in a skewed manner in the circumferential direction (2).

23. The stator (10) as claimed in claim 1, characterized in that the receiving pockets (46) have two radial walls (61, 62) which extend in a circumferential direction (2) and in which a radial aperture (64) is formed as an axially upwardly open slot (63) into which the winding wire (22) is inserted, wherein the insulation-displacement elements (70) are wider in the circumferential direction (2) than in a radial direction (4) and, centrally with respect to the circumferential direction (2), form a fork (76) with cutting edges (71) which are pushed axially over the winding wire (22) in order to cut into the winding wire and thereby to form an electrical contact, wherein outer sides (77) of the insulation-displacement elements (70) are securely clamped in the receiving pockets (46) by means of latching lugs (72).

24. An electrical machine (12) comprising
a cylindrical motor housing,
a stator (10) comprising a stator main body (34) which has radial stator teeth (14) for receiving coils (17) of an electrical winding (18) and, on an end side (39) of the stator main body (34), has an insulating lamination (40) with receiving pockets (46) for insulation-displacement elements (70), wherein the coils (17) are wound by means of a winding wire (22) which is inserted into the receiving pockets (46), wherein an interconnect plate (52) has annular conductors (84), each of the annular conductors (84) having thereon a plurality of insulation-displacement elements (70) arranged to engage axially in the receiving pockets (46) in order to make electrical contact with the winding wire (22), characterized in that the interconnect plate (52) is manufactured from plastic and has annular grooves (59) which are open axially downward and into which the annular conductors (84) are fitted, wherein the stator (10) is fitted into the cylindrical motor housing, and
a rotor mounted within the stator (10)
wherein axial centering pins (80) which engage in corresponding centering receptacles (81) in the interconnect plate (52) are molded onto the insulating lamination (40).

25. The electrical machine as claimed in claim 24, further comprising an electronic unit for activating the phases (26), the electronic unit being arranged axially above the interconnect plate (52).

* * * * *